Aug. 28, 1962 R. E. GRAHAM 3,051,778

SEQUENTIAL SCAN TELEVISION WITH LINE INTERPOLATION

Filed Oct. 20, 1960

INVENTOR
R. E. GRAHAM
BY
C. E. Hirsch Jr.
ATTORNEY

United States Patent Office 3,051,778

Patented Aug. 28, 1962

3,051,778

SEQUENTIAL SCAN TELEVISION WITH LINE INTERPOLATION

Robert E. Graham, Chatham Township, Morris County, N.J., assignor to Bell Telephone Laboratories, Incorporated, New York, N.Y., a corporation of New York Filed Oct. 20, 1960, Ser. No. 63,893
7 Claims. (Cl. 178—6.8)

This invention relates to the processing of electrical communication signals and more particularly to the transmission and reception of signals of the type which ordinarily require considerable transmission channel capacity. It is the principal object of the invention to reduce the channel capacity required of such a system by interpolating received signal portions to regenerate missing portions of the original signal solely on the basis of data available in the received signal.

The bandwidth of a television signal is a function, among other things, of the number of lines scanned in each frame. According to broadcast television standards, the frame signal is composed of two successive field signals each containing one-half of the total number of scanning lines of the frame. Thus, twice as many images are transmitted in the same time period with one-half of the total number of lines per image whereby image flicker is reduced to a tolerable level. For many special television services, however, pictures are likely to be viewed at such close distances that scanning lines are clearly visible notwithstanding an interlaced presentation. Thus, for example, in television apparatus used as an adjunct to telephone service, and in closed circuit systems for remote viewing of instruments, or the like, the usual interlaced pattern of scanning, e.g., 60 fields per second and 30 frames per second, tends to present an increased amount of interline flicker. It appears to the viewer as a 30 cycle per second flicker between neighboring lines of successive fields. Another defect of interlaced rasters manifests itself as the effective loss of one-half of the number of scanning lines for certain vertical eye movements; it is especially noticeable when the scanning structure is relatively coarse. These defects of interlaced scanning may well be so serious, particularly at close viewing distances, as to compel the use of straight sequential scanning with a consequent increase of two-to-one in the required channel bandwidth. Even in applications where frame storage means are employed to allow the use of very low frame repetition rates without flicker, the phenomenon of motion "breakup" of the image makes interlace scanning of dubious value.

It is another object of the present invention to reduce substantially the channel capacity required for the transmission of a television signal in a fashion that yields a flicker-free display without the inherent defects of interlaced scanning.

The present invention, in one of its more important aspects, relates to a system for transmitting only a fraction, e.g., one-half, of the total number of lines in a conventional interlaced television frame signal and supplying the missing lines at a receiver station by means of logical interpolation. Field storage apparatus for the interpolation operation is not necessary since the interpolation signals need be developed only on a sample-by-sample basis. For preferred modes of interpolation, however, a delay of approximately one horizontal line duration is required. An interlaced pair of fields is displayed on the face of a conventional picture tube by wobbling the scanning beam transverse to the line scanning direction and synchronously commutating first one transmitted sample and then one interpolated sample on to the beam as it is deflected cyclically between the appropriate normal and interpolated line positions.

In effect, a sequential scanning pattern is employed at the transmitter but a consequent increase in the required bandwidth is avoided by employing at the transmitter only one-half of the number of line scans ultimately needed in each complete frame; for example, every other line is simply omitted. Through logical interpolation of the transmitted information, the nontransmitted information is reconstituted, and through the use, effectively, of a dual scanning spot and synchronous commutation, the total required number of lines is displayed in each vertical scan without the need for field storage apparatus. The reduced bandwidth system thus avoids the defects of interlace scanning, e.g., interline flicker at close viewing distances, and yet achieves a two-to-one frequency saving as compared with conventional noninterlaced systems.

The invention will be fully apprehended from the following detailed description of illustrative embodiments thereof taken in connection with the appended drawings, in which.

Figures 1, 2, 4:
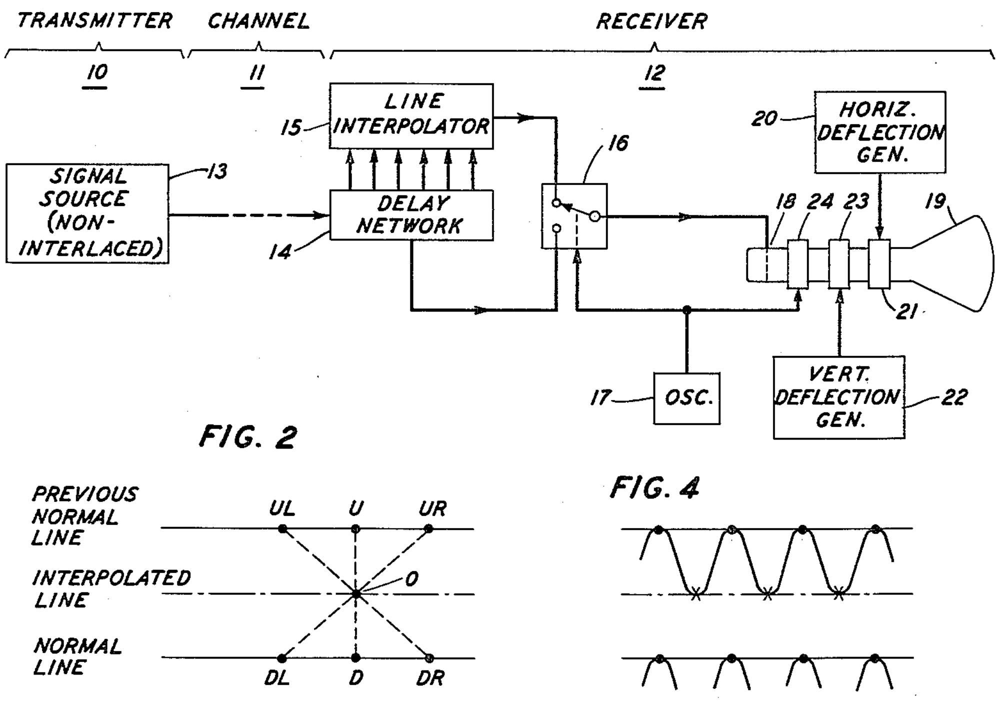
FIG. 1 is a block schematic diagram of a television transmission system in accordance with the invention.
FIG. 2 is a pictorial diagram illustrating the spatial relationship of samples in a portion of the raster of a television picture useful in explaining the operation of the invention.
FIG. 4 is a pictorial diagram helpful in explaining the synchronous commutation apparatus of FIG. 1.

Referring now to the drawings: FIG. 1 shows a sequential scan television system with line interpolation including a transmitter 10, transmission channel 11, and receiver 12. Transmitter 10 typically includes a television pick-up unit and processing apparatus of any desired kind. In accordance with the invention the television signals are developed at the transmitter in a source 13 by consecutive line scanning in which successive frame signals contain the total number of scanning lines used to specify an image. As opposed to conventional two-field interlaced scanning in which the complete specification of an image occurs in two successive fields of a frame, the sequentially scanned frame signals from source 13 completely specify the image in one field per frame; field and frame signals may be thought of as being identical. The bandwidth required for the sequentially scanned frame is made identical to the two-field interlaced system by reducing the vertical extent of the scanning spot and increasing the pitch of the scanning lines so that only one-half of the number of line scans ordinarily required to fill the raster are used. In effect, one-half of the scanning lines are used to develop a frame signal that corresponds, in an interlaced system, to one field. The second field of the interlaced frame is not required, however, and the next successive scansion of the image is, in accordance with the invention, devoted to an entirely new image, i.e., a new frame. Stated in numerical terms, an image signal developed in accordance with the present invention may typically comprise a pattern of scanning in which 50 consecutive lines are scanned to accommodate an entire frame and 60 frames per second are transmitted. The transmission bandwidth required for the 50 line signal is the same as that required for a conventional interlaced pattern of scanning in which 100 lines are scanned per frame, 50 in the first field and 50 in the second field, and in which 60 fields per second and 30 frames per second are transmitted.

The noninterlaced frame signals are transmitted via channel 11 to a receiver station 12. Any conventional terminal processing and transmission means may be employed for this purpose.

At the receiver station the "underlap" between successive lines in each frame, i.e., the unscanned area between lines, resulting from the reduced number of lines used in scanning the frame and the undersized spot used for scanning, are filled in with signals developed by logical interpolation of the received signals. Unlike interpolation receivers used in interlaced scanning systems, for example, the interpolation receivers described in R. E. Graham Patent 2,921,124, granted January 12, 1960, it is not necessary in the present invention to delay or store full frame signals to provide data for the interpolation operation. To the contrary, interpolation of the received data takes place on a sample-by-sample basis, although in a preferred embodiment line-to-line interpolation is employed. This requires a delay or storage capability of approximately one line scan period as opposed to the field delay or storage previously required. This of course is a decided advantage both from the engineering and economic viewpoints.

A process which may be thought of as variant linear interpolation of the received noninterlaced signals is accomplished by passing them through a substantially lossless delay network 14. Network 14 has a total delay slightly greater than one line scan period and is arranged to produce a number of independent signals delayed one from another that correspond to a variety of signal sample points in a matrix centered about a sample point in a missing line. The matrix of sample values moves continuously through each frame signal as it is received, and is continuously applied to line interpolator apparatus 15 wherein logical computations are performed to reconstitute the missing samples. As a result, two complementary signals are supplied to electronic switch 16; the normal scanning line signal from delay network 14 and an interpolated line signal for a line midway between the present and previous normal scanning lines. While the electronic switch 16 may be of any suitable design, an eminently suitable one is described in Patent 2,921,124.

Before entering upon a discussion of the manner in which the two contemporary signals are combined to form a sequence of consecutive frame signals, each with double the number of transmitted lines, i.e., double the number of lines per field of an interlaced scanning system, it is desirable to consider in detail the interpolation operation performed by delay apparatus 14 and line interpolator 15.

FIG. 2 illustrates the spatial relationship of a matrix of picture elements in a television raster. In the figure a typical point labelled O on one of the omitted interlaced lines is shown together with a number of surrounding points in the normal field, i.e., the field that is ordinarily transmitted. Six surrounding points UL, U, UR, DL, D, and DR are shown so arranged that there are three possible interpolation directions spaced apart by 60 degrees. Assuming adjacent picture elements to occur at $\tau$ intervals, where $\tau$ represents a Nyquist interval, the horizontal separation between adjacent points is typical about $$T=\frac{2\sqrt{3}}{3}\tau$$

or roughly 7 microseconds for a 50 line, 30 frame per second system.

Alternate line interpolation is in many respects analogous to alternate sample interpolation as described in the aforementioned Graham patent. Thus a sample average of all the surrounding points may be used for the missing signal, resulting in both horizontal and vertical blurring in exchange for a saving in bandwidth.

By resorting to line delay or storage of received data, the advantages of variant or multimode interpolation may be realized. In multimode interpolation the best of several possible interpolation modes is selected at any instant as the best value representative of the missing sample. This insures that the interpolation varies from time to time and from point to point within the changing environment of the picture and yields a subjectively pleasing approximation to the original signal. A simple determination of the smallest point-to-point signal change is effectively employed as the mode selection rule. For example, the absolute differences $|UL-DR|$, $|U-D|$, and $|UR-DL|$ are formed from the stored matrix samples. If $|UL-DR|$ is the smallest difference, $(UL+DR)/2$ is selected as the fill-in value for the missing point O. Similarly, if $|U-D|$ is the smallest difference, $(U+D)/2$ is selected as the appropriate fill-in value and if $|UR-DR|$ is the smallest, $(UR+DL)/2$ is the selected fill-in value. At the expense of enlarging the scope of the matrix, additional points may be added to extend the range of angles over which accurate interpolation may be obtained, using as an interpolation model the existence of simple straight-line contours in the picture over the extent of the matrix. Also, the horizontal structure of the matrix may be made as fine as desired by adding intervening taps between those shown in the delay line 14 and by providing the corresponding interpolation alternatives.

Figure 3:
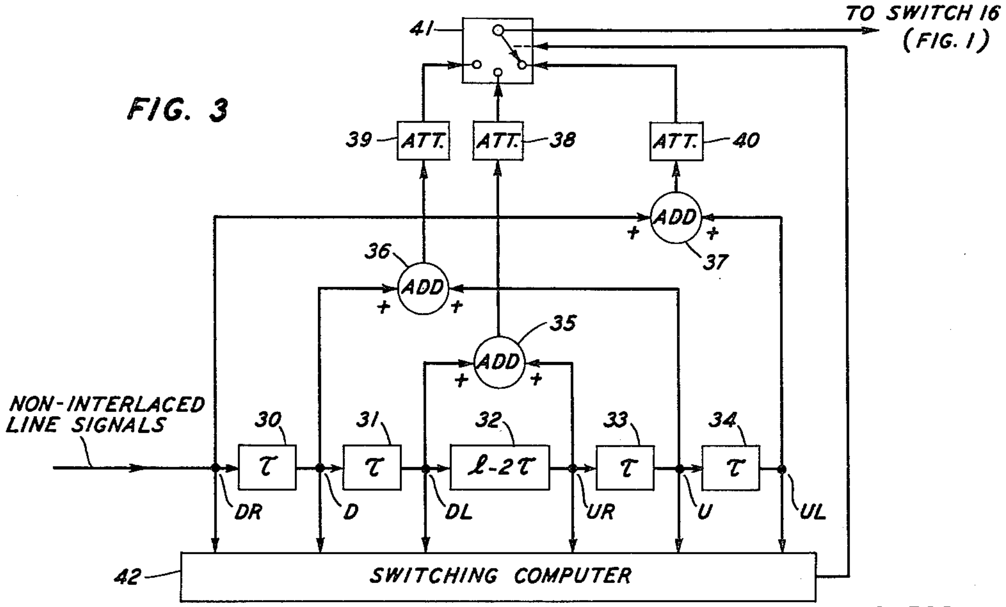
FIG. 3 is a block schematic diagram showing an arrangement of delay elements suitable for developing the signal samples illustrated in FIG. 2.

Except for a few minor modifications, the interpolation apparatus 15 may be identical to that described fully in Graham Patent 2,921,124. For that reason it, per se, forms no part of the present invention. However, for completeness, details of delay network 14 and line interpolation apparatus 15 are shown in block schematic form in FIG. 3. Noninterlaced line signals are supplied to a substantial lossless delay network comprising serially connected delay devices 30, 31, 32, 33, and 34 which provide the six points in a matrix surrounding an omitted element in a nontransmitted line signal. Delay elements 30, 31, 33, and 34 provide a delay of approximately one element time $\tau$ and delay element 32 provides a delay of one line time minus a delay of two elements times, i.e., $l-2\tau$.

Outputs of the six taps included in the delay network are paired in adders 35, 36, and 37 and passed respectively through attenuation networks 38, 39, and 40, to form three directional interpolations, each of which is a sample average along one of the three specified directions. With the surrounding points chosen from the pattern of FIG. 2 these directional interpolation values are respectively $$\frac{DL+UR}{2}$$

$$\frac{U+D}{2} \text{ and } \frac{DR+UL}{2}$$

These values are supplied to the terminals of electronic switch 41.

The several signals derived from the delay network are also applied to switching computer 42 which compares the three appropriate differences, selects the interpolation mode signal probably best representative of the missing value, and activates switch 41 accordingly to supply that interpolation as an output signal from switch 41. Details of the switching computer 42 are given in the aforementioned Graham patent.

The selected interpolation signal which changes from point to point as the scanning progresses is supplied from switch 41 to one terminal of electronic switch 16 (FIG. 1) where it is combined cyclically with the received line signals derived from delay network 14 to produce a resultant succession of normal and interlaced fields forming a complete approximation to the original signal.

Returning to a consideration of the apparatus of FIG. 1, electronic switch 16 is commutated between the normal signal and the interpolated signal by a signal derived from sinusoidal oscillator 17 operating at a frequency substantially greater than, e.g., two or three times, the highest video signal frequency encountered in the system. As a result normal line signals and interpolated line signals are alternately supplied to the control element 18 of a conventional picture display tube 19 to influence the modulation of a scanning beam. Horizontal deflection of the beam is effected by sawtooth signals generated in horizontal deflection generator 20 and applied to the horizontal deflecting coil 21 of the tube 19. Vertical deflection is effected in vertical deflection coil 23 by signals from vertical deflection generator 22.

Signals from oscillator 17 are also employed to deflect the beam of the cathode ray tubes cyclically between the appropriate normal and interpolated line positions. A square wave would be optimal for the deflecting and commutation functions; however, a sinusoidal signal is easier to apply and has been found to have a satisfactorily high percentage of "dwell" time near the extremes of the wave. The additional deflection of the beam, so-called spot wobble, is effected, for example, by supplying the output of oscillator 17 to an auxiliary deflection coil 24 appropriately positioned on the tube 19. Alternatively, the wobble function may be added to the standard deflection waves in any manner well known to those skilled in the art.

FIG. 4 illustrates the manner by which samples from a normal line scan and an interpolated line scan are combined at the face of tube 19 to form a pair of scanning lines. As scanning proceeds in the horizontal direction, the beam is wobbled at a relatively high frequency such that the one extreme of the sinusoidal wave dwells at a point corresponding to the normal scanning line and, while dwelling at that location, a sample from a normal line scan is supplied from delay network 14 by way of electronic switch 16 to the control element 18. At the other extreme of the sinusoidal cycle the beam dwells momentarily at a location corresponding to one of the missing line scans, i.e., at a point midway between consecutive normal line scans. During the latter dwell a sample of a missing line signal provided by line interpolator 15 is applied by way of switch 16 to the control element 18.

The picture developed on the face of the tube as a result of the signal commutation and spot wobble contains, for the example previously given, a raster composed of 100 scanning lines in a single vertical period and, providing that the interpolation process is sufficiently effective, has approximately the quality of a conventional 100 line picture. Moreover, interline flicker is absent inasmuch as each of the developed frame signals are repeated 60 times per second as opposed to a frame repetition rate of 30 cycles per second for the normal interlace television scanning system.

While the invention has been described in connection with various illustrated embodiments, many other variations in the interpolation technique may be devised by those skilled in the art without departing from the spirit and scope of the invention. For example, it is obvious that there is a wide choice of detailed interpolator operating rules that may be used to advantage in the practice of the invention.

What is claimed is:

1. Television transmission apparatus that comprises a source of picture signals including a sequence of signal elements arranged in a succession of field signal groups, means for transmitting selected field signals to a receiver station, means at said receiver station for deriving from said received field signals a plurality of interpolated picture signal elements representative respectively of elements in nontransmitted field signals, means for choosing one of said plurality of interpolated signal elements for each corresponding element in said nontransmitted field, image reproducing means including means adapted to scan an image screen with an electron beam subjected to field, line, and wobble deflections, said wobble deflections being transverse to said line deflections, and means for influencing said beam alternately with one of said received field signal elements and one of said chosen interpolated signal elements in synchronism with said wobble deflections.

2. In combination, a source of picture signals including a sequence of signal elements arranged in a succession of field signal groups, means for transmitting selected field signals to a receiver station, means at said receiver station for deriving from said received field signals a plurality of interpolated picture signal elements representative respectively of elements in each nontransmitted field signal, means for choosing that one of said plurality of interpolated signal elements that best represents the corresponding element in said nontransmitted field signal, picture reproducing means including means adapted to scan a picture screen with an electron beam subjected to field, line, and wobble deflections, said wobble deflections being transverse to said line deflections and occurring at a frequency high compared with the highest frequency component in said picture signals, and means operating at said wobble deflection frequency for influencing said beam alternately with one of said received field signal elements and one of said chosen interpolated signal elements.

3. Apparatus for effectively increasing the number of lines in television frame signal representative of a picture that comprises, means for deriving from a sequence of television line signals consecutively arranged to form a frame signal, a plurality of interpolated picture signal elements representative respectively of missing picture signal elements that lie, in said picture, in lines positioned midway between lines of said sequence, means for selecting one of said plurality of interpolated signal elements for each corresponding missing picture signal element, image reproducing means, means adapted to scan an image screen associated with said image reproducing means with an electron beam, means for subjecting said electron beam to field, line, and wobble deflections, said wobble deflections being transverse to said line deflections, and means for synchronously influencing said beam alternately with one of said frame signal elements and one of said selected interpolated signal elements at the rate of said wobble deflections.

4. In combination, a source of noniterlaced line scan signals representative of a picture scene, means for deriving from said line scan signals a plurality of auxiliary line scan signals, each representative respectively of one line of said picture scene not encompassed by one of said line scan signals but closely correlated therewith, means for intercalating said line scan signals and said auxiliary line scan signals to form a composite signal representative of said picture scene, and means for displaying said composite signal on an image screen.

5. In combination, a source of noninterlaced line scan signals representative of a picture scene, means for deriving from said line scan signals a plurality of auxiliary line scan signals, each representative respectively of one line of said picture scene not encompassed by one of said line scan signals but closely correlated therewith, image display means including an image screen, a beam of electrons influenced by said line scan signals, and means for deflecting said beam in a raster pattern on said screen, said raster pattern comprising a sequence of line scans, means for additionally deflecting said beam cyclically in a direction transverse to said line scans, and means coordinated with said cyclic deflections for alternately selecting elements from one of said line scan signals and from one of said auxiliary line scan signals for influencing said beam of electrons.

6. Apparatus for reducing the bandwidth requirements of a transmission channel that comprises means for scanning an image scene in a sequential pattern of substantially horizontal lines, means for transmitting to a receiver station said lines of information, means at said receiver station for developing by logical interpolation of said transmitted lines of information a plurality of lines of information intermediate said lines selected for transmission, and means for intercalating respectively a selected one of said plurality of interpolated lines with the corresponding transmitted lines, said intercalating means including electron beam tube means, means adapted to scan a sensitive screen associated with said beam tube means with an electron beam, means for subjecting said electron beam to field, line, and wobble deflections, said wobble deflections being transverse to said line deflections, and means for influencing said beam alternately with a sample of one of said interpolated lines of information and with a sample of one of said transmitted lines of information in synchronism with said wobble deflections.

7. Apparatus for increasing the vertical detail of pictures in a television system including a source of video signals arranged in a raster of noninterlaced horizontal lines, said apparatus comprising means for continuously deriving from said video signals a plurality of brief samples representative respectively of a matrix of samples from two adjacent horizontal lines, means for analyzing the samples of said matrix, means responsive to said analysis for generating a brief sample statistically representative of a sample of said matrix positioned on a horizontal line at a point approximately midway between said two adjacent lines, image reproducing means including means for scanning an image screen with an electron beam and means for influencing said beam with vertical and horizontal deflections, an oscillator operating at a frequency greater than the highest frequency component of said video signals, means responsive to said oscillations for sinusoidally deflecting said beam in a direction substantially transverse to said horizontal lines with a magnitude substantially equal to one-half of the pitch of two adjacent horizontal lines, and means responsive to said oscillations for alternately modulating said beam with a video sample from one of said lines at the instants that said beam is at first extremals of its transverse excursions and with one of said statistically generated samples at the instants that said beam is at opposite extremals of its transverse excursions.

References Cited in the file of this patent

UNITED STATES PATENTS 2,989,587 Bedford ______________ June 20, 1961